United States Patent [19]

Miller et al.

[11] Patent Number: 4,866,357
[45] Date of Patent: Sep. 12, 1989

[54] WINDSHIELD WIPER AND CONTROL SYSTEM

[75] Inventors: John M. Miller, Saline; Ronald G. Landman, Ypsilanti; James E. Fenton, Ann Arbor, all of Mich.

[73] Assignee: Ford Motor Company, Dearborn, Mich.

[21] Appl. No.: 286,199

[22] Filed: Dec. 19, 1988

[51] Int. Cl.⁴ .............................................. B60S 1/08
[52] U.S. Cl. ............................. 318/443; 318/DIG. 2
[58] Field of Search .......... 318/443, 444, 483, DIG. 2; 15/250 C, 250.12, 250.13

[56] References Cited

U.S. PATENT DOCUMENTS

| | | | |
|---|---|---|---|
| 4,309,646 | 1/1982 | Liedtke et al. | 318/444 X |
| 4,314,186 | 2/1982 | Gille et al. | 318/DIG. 2 X |
| 4,329,631 | 5/1982 | Betsch et al. | 318/444 X |
| 4,375,610 | 3/1983 | Nagaoka et al. | 318/444 |
| 4,431,954 | 2/1984 | Carpenter et al. | |
| 4,544,870 | 10/1985 | Kearns et al. | |
| 4,585,980 | 4/1986 | Gille et al. | 318/DIG. 2 X |
| 4,614,903 | 9/1986 | Betsch et al. | |
| 4,663,575 | 5/1987 | Juzswik et al. | 318/282 X |
| 4,705,997 | 11/1987 | Juzswik | |
| 4,742,280 | 5/1988 | Ishikawa et al. | |

FOREIGN PATENT DOCUMENTS

| | | | |
|---|---|---|---|
| 57-126744 | 8/1982 | Japan | 15/250.12 |
| 152521 | 8/1978 | United Kingdom | 318/DIG. 2 |

Primary Examiner—Bentsu Ro
Attorney, Agent, or Firm—Allan J. Lippa; Peter Abolins

[57] ABSTRACT

A windshield wiper system for continuously controlling position and velocity of a wiper blade as it sweeps across the windshield. The blade is coupled directly to a motor having an encoder for continuously generating actual position pulses related to blade movement across the windshield. Desired position pulses are continuously generated which are related to desired blade position during the sweep. Both desired and actual position pulses are accumulated or counted such that desired and actual blade position are continuously known during the sweep. An error signal is generated by comparing accumulated desired and actual position pulses. Motor speed is corrected in response to the error signal for continuously correcting blade position and velocity.

20 Claims, 5 Drawing Sheets

WINDSHIELD WIPER AND CONTROL SYSTEM

BACKGROUND OF THE INVENTION

The field of the invention relates to windshield wiper systems.

Conventional wiper systems couple an electric motor to the wiper blade or blades by a gearing mechanism. In one common approach, the direction of sweep across the windshield is reversed through a reversible linkage such that the motor rotates in only one direction. In another approach, blade sweep is reversed by reversing current through the motor. Both approaches are subject to a variety of problems. For example, blade velocity varies with blade wear, windshield conditions, battery voltage, and wear in the mechanical linkage. Further, when the blade abruptly reverses direction at the end of a sweep, the resulting blade flexing is both annoying to the vehicle operator and may impair complete removal of precipitation. There may also be variation between forward and reverse sweeps due to the mechanical characteristics in linkage between the motor and blade.

U.S. Pat. No. 4,663,575 issued to Juzswik et al on May 5, 1987 addresses some of these problems. This patent discloses an electric motor driving wiper blades via mechanical linkage. Forward and reverse blade sweep is accomplished by reversing current through the motor in response to electronic control circuitry. Before reversing directions, the motor is either accelerated or decelerated a predetermined time in response to a stored program or wiper profile. At best, however, this system can only correct for average blade velocity. More specifically, a cam signal provides an indication of when the blade has reached the end of a sweep. In response, the complete sweep duration is timed and compared to a desired sweep time. Current supplied to the motor is then adjusted such that the next sweep duration more accurately corresponds to the desired sweep duration.

The inventors herein have recognized numerous disadvantages to the prior approaches described above. For example, only the average blade velocity is adjusted. Stated another way, only the blade velocity averaged over a complete sweep is adjusted. Thus, when the blade traverses a slippery section on the windshield, it abruptly accelerates over that portion and then decelerates as shown in FIG. 1. The converse is true when the blade is impeded by a section of snow or slush on the windshield. These abrupt changes in velocity are both annoying to the operator and may impede complete removal of precipitation. The abrupt velocity changes may also result in blade chatter which reduces blade wear and is an additional annoyance to the operator. Further, since blade velocity is only corrected at the end of a sweep, a velocity change during a sweep may result in an unwanted pause between sweeps as illustrated in FIG. 1.

SUMMARY OF THE INVENTION

It is an object of the invention described herein to accurately maintain blade velocity at a desired velocity profile across the entire blade sweep regardless of nonuniform conditions on the windshield.

The above-described problems and disadvantages of prior approaches are overcome, and above-described object achieved, by providing a wiper system which controls both position and velocity of the wiper blade as claimed herein. In one particular aspect of the invention, the system comprises: a reversible electric motor coupled to the blade; position indicating means for continuously generating actual position pulses as the blade sweep across the windshield; a first counter for counting the actual position pulses to provide an actual position count related to actual blade position; means for generating desired position pulses having one of a plurality of repetition rates each related to a corresponding one of a plurality of desired rates of movement of the blade; a second counter for counting the desired position pulses to provide a desired position count related to desired wiper position at each desired position pulse; error generating means for generating a position error signal in response to a comparison of the actual position count and the desired position count; and power means for applying electric power to the electric motor in relation to the position error signal.

An advantage of the above aspect of the invention is that actual position and velocity of the blade are continuously maintained across the entire blade sweep. Thus, even when the blade encounters a slippery area, or a high resistance area, a substantially constant blade velocity is maintained. Abrupt changes in blade sweep and chatter are thereby minimized.

In another aspect of the invention, the system comprises: a reversible electric motor coupled to the blade; position indicating means for generating actual position pulses as the wiper moves across the windshield; a first counter for counting the actual position pulses to provide an actual position count related to actual blade position; means for generating desired position pulses having a repetition rate related to a desired blade velocity; a second counter for counting the desired position pulses for providing a desired position count related to desired wiper position at each desired position pulse; error generating means for generating a position error signal in response to a comparison of the actual position count and the desired position count; a third counter for counting the actual position pulses during a predetermined time period to generate a velocity signal related to actual blade velocity; means for combining the velocity signal with the error signal to generate a modified error signal; and power means for applying electric power to the electric motor in relation to the modified error signal.

An advantage of the above aspect of the invention is that actual position and velocity of the blade are continuously maintained. In the event of blade acceleration, such as when encountering an icy patch, the system quickly reduces blade velocity to a desired velocity. A further advantage is that velocity feedback from the third counter dampens any overshoot, undershoot, or oscillation which might otherwise occur in correcting velocity fluctuations.

BRIEF DESCRIPTION OF THE DRAWINGS

The object and advantages described herein will be more fully understood by reading the description of the preferred embodiment with reference to the drawings wherein:

FIG. 7 is an electrical schematic of a portion of the circuitry shown in FIG. 2.

DESCRIPTION OF THE PREFERRED EMBODIMENT

Figure 2:
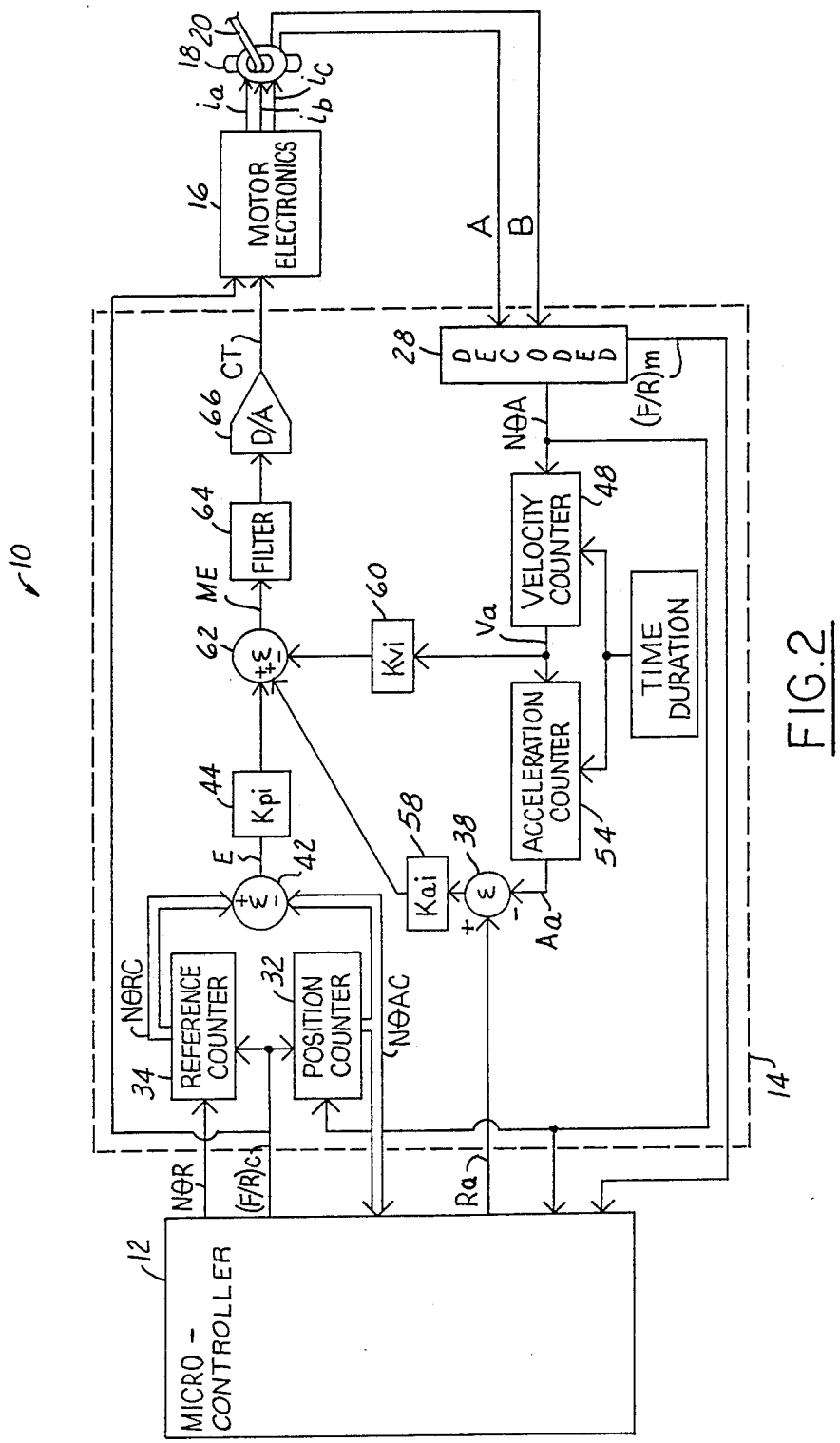
FIG. 2 is an electrical schematic of an example of a windshield wiper system in which the invention described herein is used to advantage.
Figure 3:
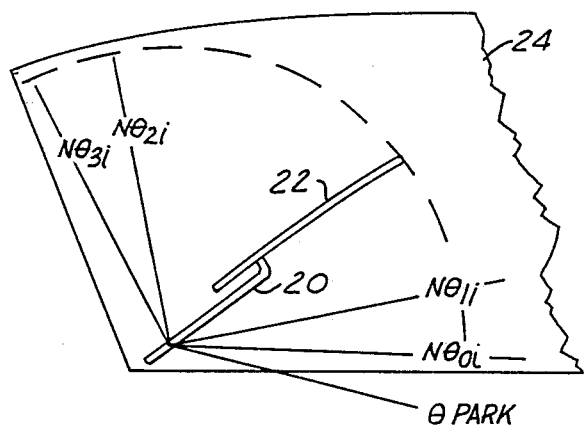
FIG. 3 illustrates the sweep of a wiper blade across a portion of a windshield.

Referring in general terms to FIG. 2, windshield wiper system 10 is shown including microcontroller 12, motion controller 14, motor electronics 16, electric motor 18, and blade arm 20 coupled to wiper blade 22. In this particular example, microcontroller 12 is an off-the-shelf chip sold by Texas Instruments as part no. TMS320C14. Motion controller 14, as described in greater detail hereinafter, is shown including discrete digital components. It is noted, however, that the operation of motion controller 14 may be performed by microcontroller 12 and, conversely, the operation of microcontroller 12 may be performed by discrete digital components.

Figure 4A:
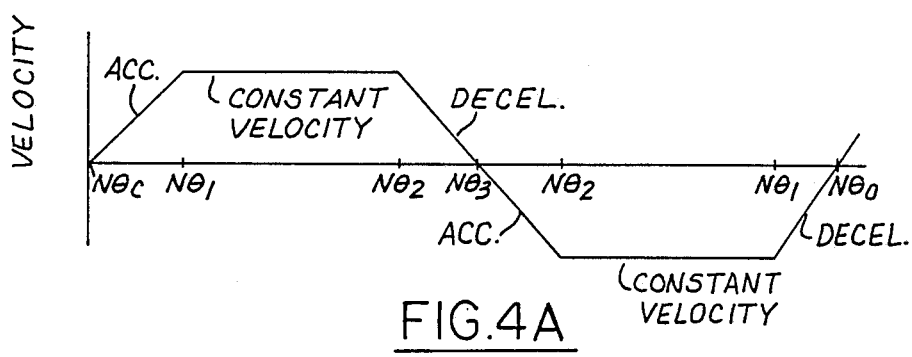
FIG. 4A illustrates the desired velocity profile of a wiper blade with reference to various positions shown in FIG. 3.
Figure 4B:
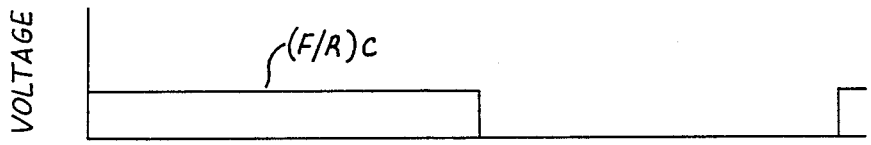
FIG. 4B shows an electrical waveform of a signal generated in the electrical schematic shown in FIG. 2.
Figure 4C:
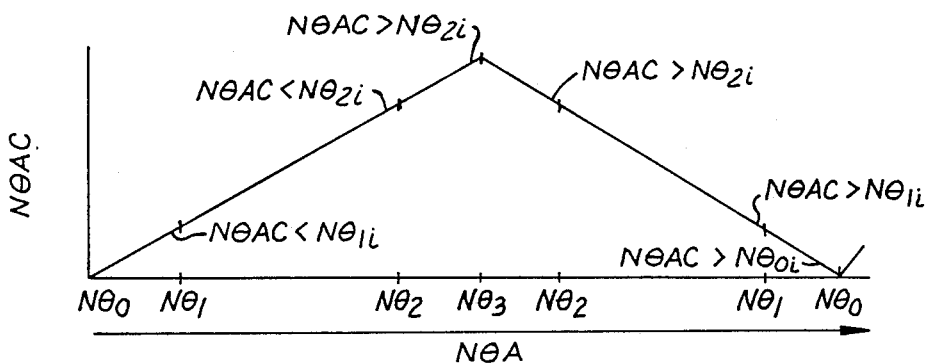
FIG. 4C shows an electrical waveform of a signal generated in the electrical schematic shown in FIG. 2.

As described in greater detail hereinafter, each angular movement of motor 18, and accordingly blade 22, results in feedback of a N$\theta$A position pulse. For the particular example shown herein, one N$\theta$A pulse is generated every 1/1000° movement of motor 18 although different resolution values may be used to advantage. In response to each actual position pulse N$\theta$A, microcontroller 12 and motion controller 14 correct the position and velocity of blade 22 for maintaining a desired predetermined velocity profile (FIG. 4A) across windshield 24. Blade 22 is controlled by regulating the electrical current supplied to motor 18 via motor electronics 16 in response to torque command CT from motion controller 14.

Microcontroller 12 is shown receiving actual position pulses N$\theta$A and actual motor direction signal (F/R)m from decoder 28 which is coupled to motor 18. Microcontroller 12 is also shown receiving actual pulse position count N$\theta$AC from position counter 32 shown incorporated within motion controller 14. Desired or reference position pulses N$\theta$R are shown provided by microcontroller 12 to reference counter 34 of motion controller 14. Microcontroller 12 also provides motor direction control signal (F/R)c to position counter 32, reference counter 34, and motor electronics 16. Position counter 32 and reference counter 34 count up in response to a high logic state of signal (F/R)c and count down in response to a low logic state of signal (F/R)c. In response to the logic state of signal (F/R)c, motor electronics 16 changes the direction of motor 18 by appropriately reversing current duration. Microcontroller 12 also provides reference accelerate signal Ra and gain constants Kpi, Kai, and Kvi to motion controller 14.

The structure of motion controller 14 is now described with continuing reference to FIG. 2. Position counter 32, a 12-bit digital counter or accumulator in this example, provides count N$\theta$AC of actual position pulses N$\theta$A. Thus, at the end of each N$\theta$A pulse, count N$\theta$AC represents the actual or instantaneous position of blade 22 on windshield 24. Similarly, reference counter 34, also a 12-bit digital counter or accumulator in this example, provides count N$\theta$RC of reference position pulses N$\theta$R. At the end of each N$\theta$R pulse, count N$\theta$RC represents the desired position of blade 22 on windshield 24. Summer 42 is shown computing the difference between N$\theta$RC and N$\theta$AC for generating error signal E at each N$\theta$A pulse. Thus, error signal E continuously represents the difference between actual and desired position every N$\theta$A pulse as blade 22 sweeps across windshield 24.

Gain multiplier 44 multiplies error signal E by gain constant Kpi dependent upon the velocity profile i selected by the vehicle operator. Velocity counter 48 provides actual velocity signal Va, proportional to the actual velocity of blade 22, by counting N$\theta$A pulses over a predetermined time duration as provided by time duration counter 50. Velocity signal Va is counted or accumulated over the predetermined time duration in accelerator counter 54 to generate actual acceleration signal Aa. Summer 38 compares actual acceleration signal Aa to reference acceleration Ra for generating an acceleration error signal. Multiplier 58 then multiplies the acceleration error signal by gain constant Kai. Actual velocity signal Va is shown multiplied in gain multiplier 60 by gain constant Kvi dependent upon operator selection of velocity profile i. The output of both gain multiplier 58 and 60 are shown coupled to summer 62 for modifying error signal E to generate modified error signal ME.

As described in greater detail hereinafter with particular reference to FIG. 6, feedback from velocity signal Va and actual acceleration signal Aa provides faster return to steady state when a velocity perturbation occurs with less undershoot and overshoot then would otherwise occur without these feedback loops. Modified error signal ME is shown filtered in low pass filter 64 and converted to an analog signal CT in conventional digital to analog (D/A) converter 66. In response to torque command signal CT from D/A converter 66, motor electronics 16 provides the commanded current to motor 18 as described later herein with particular reference to FIG. 7A. Thus, the position and velocity of blade 22 are directly related to torque command signal CT.

The operation of windshield wiper system 10 is now described. Referring first to FIGS. 3 and 4A–4C, blade 22 is shown positioned on arm 20 for sweeping across windshield 24. Reference values N$\theta_{0i}$, N$\theta_{1i}$, N$\theta_{2i}$, and N$\theta_{3i}$ are stored angular position values for a selected velocity profile i. In general terms, windshield wiper system 10 controls blade 22 to accelerate in a forward direction [(F/R)c=1] from rest at N$\theta_{0i}$ to N$\theta_{1i}$, then maintain constant velocity until N$\theta_{2i}$, decelerate to N$\theta_{3i}$, reverse direction [(F/R)c=0] and accelerate to N$\theta_{2i}$, maintain constant velocity to N$\theta_{1i}$, and decelerate to N$\theta_{0i}$. A similar movement for a particular velocity profile (designated by subscript 1) selected by the vehicle operator is shown graphically in FIG. 3A.

Figure 5:
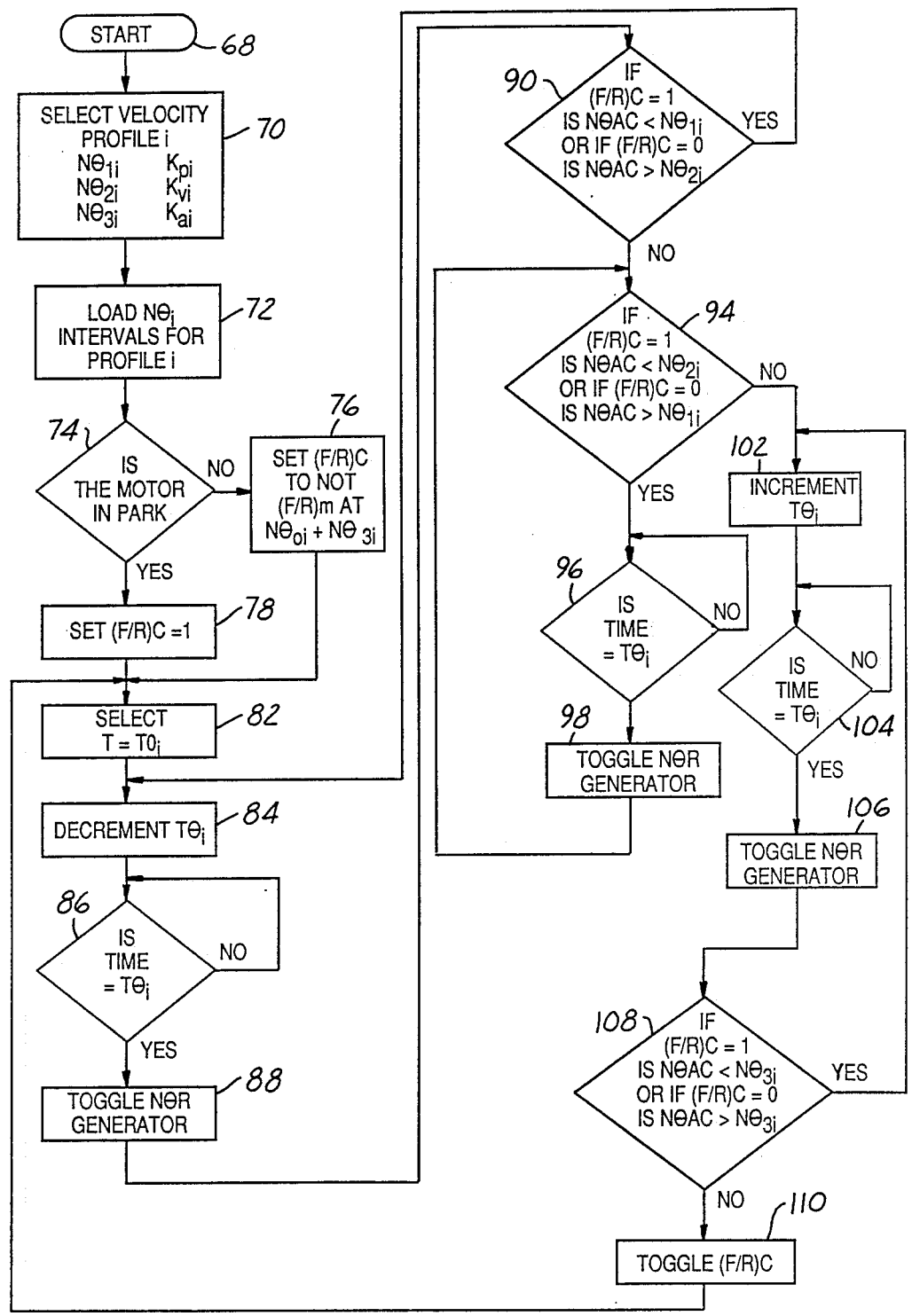
FIG. 5 shows the process steps of a portion of the circuitry illustrated in FIG. 2.

During the entire forward and reverse sweep as described above, blade 22 is continuously corrected by feedback of NθA pulses to maintain desired position and velocity. This feedback is now described in greater detail with particular reference to the processing steps of microcontroller 12 shown in FIG. 5 and the associated electrical waveforms shown in FIGS. 4A–4C. As shown by step 70, gain values Kpi, Kvi, and Kai are retrieved from internal ROM storage for the particular velocity profile selected and transferred to respective gain multipliers 44, 58, and 60 in motion controller 14. Reference values $N\theta_{1i}$, $N\theta_{2i}$, and $N\theta_{3i}$ are also accessed from internal storage. These values are transferred into an internal buffer storage in step 72 for the comparison operations described later herein. During step 74, a determination is made of whether blade 22 is in the park position. If blade 22 is not in park, direction command signal (F/R)c is set to the opposite state of motor direction signal (F/R)m when blade is at either the $N\theta_{0i}$ or $N\theta_{3i}$ positions as shown in step 76. If blade 22 is in park, signal (F/R)c is set to a logic "1" during step 78.

After signal (F/R)c is appropriately set, the acceleration processing described with reference to steps 82, 84, 86, 88, and 90 commences. In general, desired position pulses NθR are provided at a gradually increasing pulse repetition rate for gradually accelerating blade 22 to a desired velocity. More specifically, time duration $T\theta_i$ is selected in step 82 for the repetition rate of the initial NθR pulses. After the time duration of the initial repetition rate has elapsed, as determined in step 86, the first NθR pulse is generated in step 88. During step 90, a determination is made of whether the actual position of blade 22 is still in an acceleration range. The determination is made by comparing actual position count NθAC (FIG. 4C) from position counter 32 to reference position $N\theta_{1i}$ when blade 22 is moving in a forward direction. When blade 22 is moving in a reverse direction, the determination is made by comparing actual position count NθAC to reference position $N\theta_{2i}$. Since actual position counter 32 is counting down when blade 22 is moving in the reverse direction, blade 22 is within the acceleration range when NθAC is greater than $N\theta_{2i}$. If the determination of step 90 indicates that acceleration is still required, selected time $T\theta_i$ is decremented in step 84 thereby decreasing the repetition rate of the next desired position pulse NθR. Stated another way, the frequency of desired position pulses NθR is gradually increased when blade 22 is within the acceleration ranges.

When a determination is made in process step 90 that the position of blade 22 is not within the acceleration ranges, a determination is then made in step 94 of whether blade 22 is either in the constant velocity range or in the deceleration range. More specifically, blade 22 is n the constant velocity range when sweeping forward and actual position pulse count NθAC is greater than position reference $N\theta_{2i}$; or when blade 22 is sweeping in a reverse direction and actual position pulse count NθAC is greater than $N\theta_{1i}$. In response to the constant velocity determination, a desired position pulse NθR is generated in steps 96 and 98 after a time delay equal to the last $T\theta_i$ time duration selected in step 86. A determination of whether blade 22 is still in the constant velocity mode is then repeated in process step 94. If it is determined that blade 22 is still within the constant velocity range, another desired position pulse NθR is generated in steps 96 and 98. Thus, desired position pulses are continuously provided at a constant frequency when blade 22 is within the constant velocity range.

If blade 22 is not either in the acceleration range or the constant velocity range, desired position pulses are provide at gradually increasing repetition rate by process steps 102, 104, 106, 108, and 110 for decelerating blade 22. More specifically, time delay $T\theta_i$ is incremented a predetermined amount by process step 102. During subsequent process steps 104 and 106, a desired position pulse is generated after the updated $T\theta_i$ time has elapsed. Thereafter, a determination of whether blade 22 is still within the deceleration range is made by comparing actual position count NθAC with reference position $N\theta_3$ in process step 108. If the determination is affirmative, time delay $T\theta_i$ is again incremented in step 102 and a new desired position pulse generated in steps 104 and 106. Thus, while blade 22 is within the deceleration ranges, desired position pulses are generated at a gradually decreasing frequency.

When a determination is made in step 108 that blade 22 is not within the deceleration ranges, microcontroller 12 switches back to the acceleration mode beginning with step 82 and operation continues as previously described herein. During an interval wipe mode, however, a delay time is inserted before switching to the acceleration mode.

While desired position pulses are being generated by microcontroller 12 to generate a desired velocity profile, motion controller 14 is continuously correcting blade 22 position by comparing actual position pulses NθA to reference position pulses NθR. As previously described herein, each actual position count NθAC and reference position count NθRC is compared on a pulse by pulse basis to generate error signal E. The resulting error signal E is a representation of deviation between an actual blade position and desired blade position. Error signal E is modified by velocity feedback and acceleration feedback to generate modified error signal ME. These higher order feedback variables dampen undershoot and overshoot, and provide faster feedback response, which may otherwise occur by corrections only from error signals. Electrical power is applied to motor 18 in direct relation to modified error signal ME thereby correcting position and velocity of blade 22 every actual position pulse NθA (1/1000° in this example) as blade 22 sweeps across windshield 24.

Figure 1:
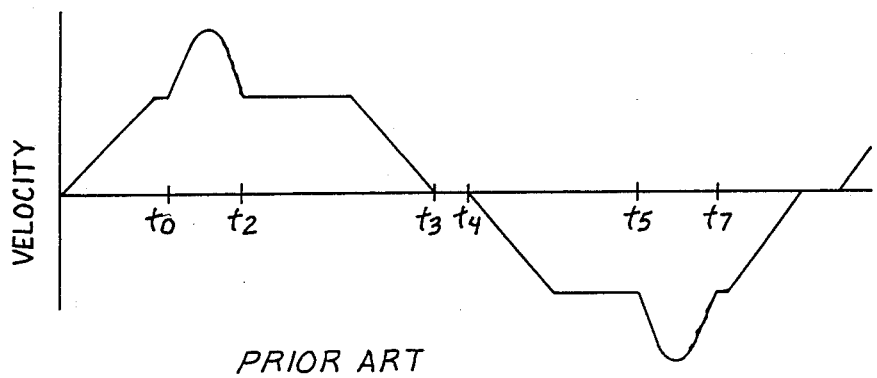
FIG. 1 illustrates the velocity profile of a windshield wiper in a prior approach wherein the wiper blade encounters a slippery section of the windshield.
Figure 6:
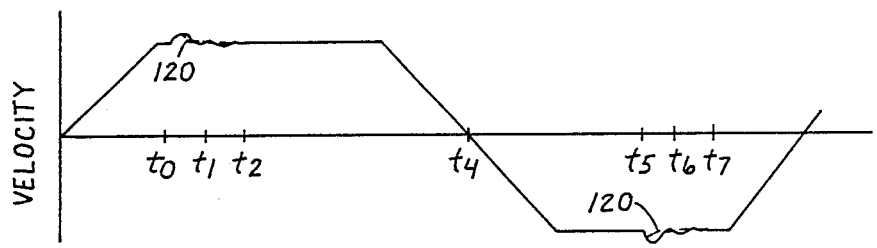
FIG. 6 illustrates the velocity profile of a wiper blade under control of the windshield wiper system shown in FIG. 2 when the blade encounters an icy spot on the windshield.

An example of operation of windshield wiper system 10 is presented in FIG. 6 wherein an ice patch is encountered between times $t_0$ and $t_2$ in the forward direction and between times $t_5$ and $t_7$ in the reverse direction. The solid line shown in FIG. 6 indicates correction only by error signal E and the dashed line indicates correction by error signal ME. It is noted that blade 22 is corrected while still traversing the icy spot (i.e. before $t_2$) such that it returns to desired operation by $t_1$. Further, any velocity perturbation in blade 22 caused by the ice patch is minimized whereas prior approaches were unable to provide any correction for a velocity perturbation (see FIG. 1). Prior approaches could only correct for average velocity across the entire sweep.

Figure 8:
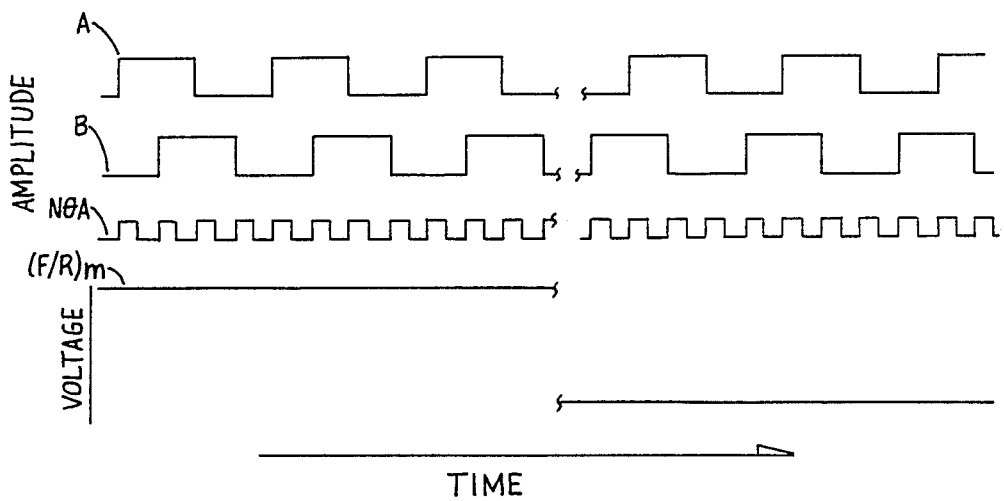
FIG. 8 shows a train of position pulses A and B generated by encoder as motor reverses direction.
Figures 7A, 7B:
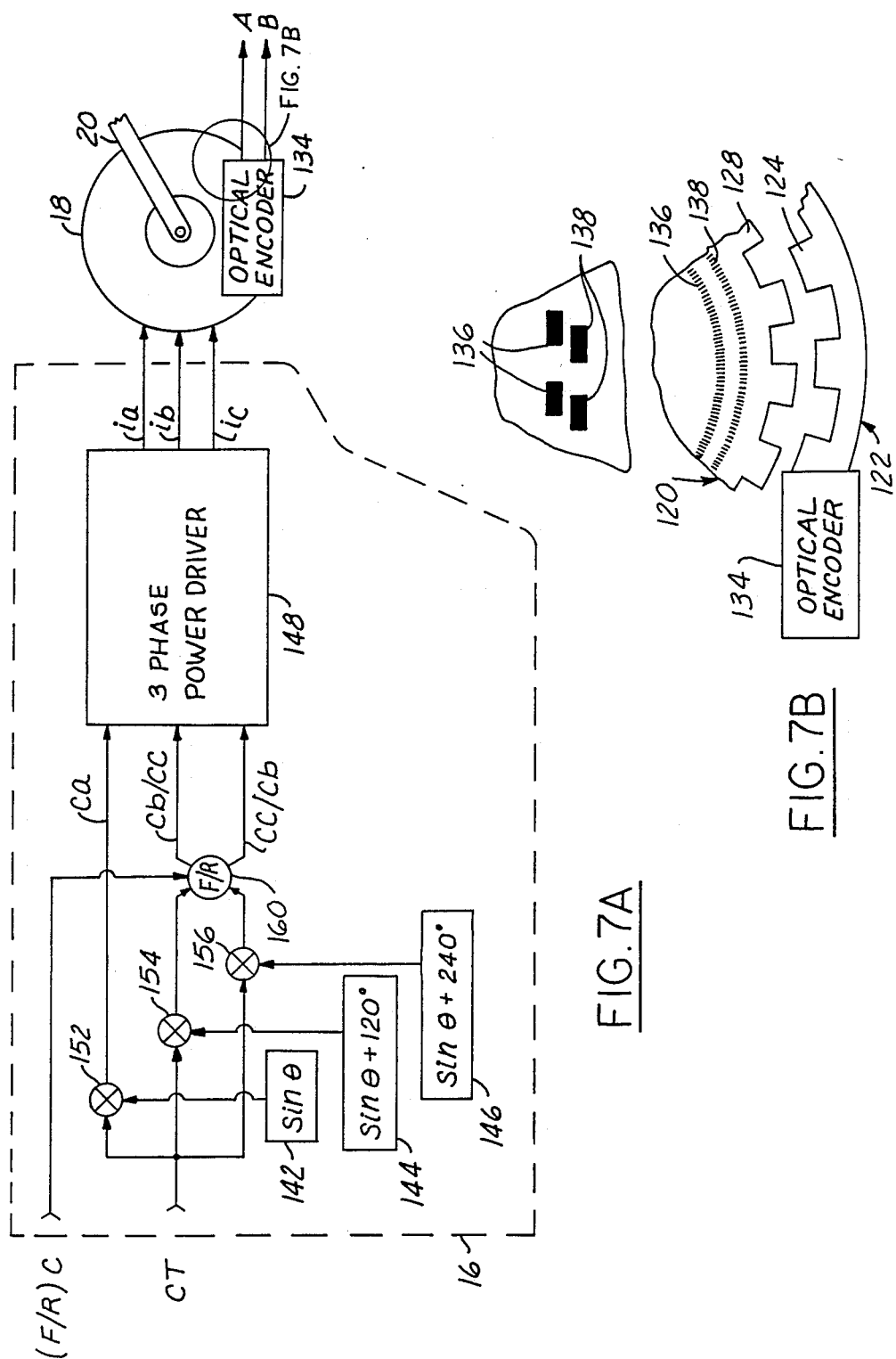
FIG. 7B is an expanded view of a portion of FIG. 7A.

Motor electronics 16, motor 18 and the generation of actual position pulses NθA are now described in more detail with reference to FIGS. 7A and 7B. In this example, motor 18 is a 3-phase reluctance motor supplied with motor electronics 16 by Superior Electric, Bristol, Connecticut under trade name Slo-Syn ™. Motor 18 includes 3 pairs of poles (a, b, and c - not shown) symmetrically positioned around stator 122 and coupled to respective electrical current outlet ports $i_a$, $i_b$, and $i_c$ of motor electronics 16. Stator 122 includes stator teeth 124 (approximately 151 in this example) for magnetically coupling to rotor teeth 128 of rotor 130 in a conventional manner. Rotor 130 includes two concentric patterns of bar codes 136 and 138 shown in this example forming two repetitive patterns phase shifted from each other by 90°. Encoder 134, a conventional 2-receptacle bar code reader in this example, optically reads bar code patterns 136 and 138 for generating respective encoded position signals A and B (FIG. 8). Accordingly, the repetition rate of position signals A and B is directly related to velocity of rotor 150 and therefore velocity of blade 22. It is further note that movement of blade 22 by a predetermined angular displacement results in a corresponding number of predetermined A and B pulses. Decoder 18 (FIG. 2) decodes position signals A and B as described hereinafter with particular reference to FIGS. 2 and 8.

Motor electronics 16 includes conventional oscillators 142, 144, and 146 which are phased locked with rotor 130 for producing three sinusoidal waves phase shifted by 120°. The outputs of oscillators 142, 144, and 146 are shown connected to respective analog summing junctions 152, 154, and 156 for multiplication with torque command signal CT from D/A convertor 66. Summing junction 152 is shown providing current command ca directly to 3-phase driver 148. The outputs of summing junctions 154 and 156 are shown coupled to analog switch 160. Direction command signal (F/R)c is shown coupled to analog switch 160 such that output current command signals cb and cc are directly coupled to respective oscillators 144 and 146 when motor 16 is commanded to move in a forward position. Similarly, current command signals cb and cc are coupled to respective oscillators 146 and 144 when motor 16 is commanded to move in a reverse direction. 3-phase power driver 148 conventionally couples current ($i_a$, $i_b$, $i_c$) to stator coils a, b, and c in response to the current command signals (ca, cb, and cc).

The operation of decoder 18 for generating actual position pulses NθA and actual motor direction signal (F/R)m from position signals A and B is now described. For illustrative purposes, FIG. 8 shows a train of position pulses A and B generated by encoder 134 as motor 18 reverses direction. Position signals A and B are generated when rotor 18, and accordingly blade 22, move a predetermined amount (1/1000° in this particular example). In response to both the leading and trailing edges of signals A and B, decoder 28 generates actual position pulses NθA. Decoder 18 also provides actual motor direction signal (F/R)m by decoding position signals A and B. For example, when position signals A and B change from respective logic "1,1" states to respective logic "0,1" states, decoder 28 provides a forward direction indication by setting signal (F/R)m to a logic "1" state. Similarly, when position signals A and B change from respective logic "1,1" states to respective logic "1,0" states decoder 28 provides a reverse direction indication by setting signal (F/R)m to a logic "0" state.

It is noted that the time period for each cycle of actual position pulses NθA is a measurement of the corresponding time duration for movement of blade 22 by a predetermined distance. Further, the frequency of actual position pulses NθA is directly related to actual velocity of blade 22 at any instant in time. In addition, as previously described herein with particular reference to actual position counter 32, a count of actual position pulses at a particular time provides a measurement of the actual position of blade 22 at that particular instant in time. These characteristics are used to advantage by windshield wiper system 10 in continuously controlling actual position and velocity of blade 22 as previously described herein.

This concludes the description of the preferred embodiment. The reading of it by those skilled in the art will bring to mind many alterations and modifications without parting from the spirit and scope of the invention. Accordingly, it is intended that the scope of the invention be limited only by the following claims.

What is claimed:

1. A windshield wiper system for controlling a wiper blade on a windshield, comprising:
    an electric motor coupled to the blade;
    position indicating means for generating an actual position pulse for each predetermined angular movement of the blade;
    an accumulator for counting said actual position pulses to provide an actual position count related to actual blade position;
    comparison means for comparing said actual position count to a reference to generate an error signal; and
    power means for applying electric power to said motor in relation to said error signal.

2. The system recited in claim 1 wherein said motor is directly coupled to said blade.

3. The system recited in claim 1 wherein said motor comprises a stator and rotor.

4. The system recited in claim 3 further comprising an optical encoder coupled to said rotor for providing phase pulses as said rotor rotates.

5. The system recited in claim 4 further comprising a decoder for converting said phase pulses to said actual position pulses.

6. The system recited in claim 1 further comprising reversing means coupled between said power means and said motor for reversing movement of said motor in response to a comparison of said actual position count with a predetermined count.

7. A windshield wiper system for controlling position and velocity of a wiper blade on a windshield, comprising:
    a reversible electric motor coupled to the blade;
    position indicating means for continuously generating actual position pulses as the blade sweeps across the windshield;
    a first counter for counting said actual position pulses to provide an actual position count related to actual blade position;
    means for generating desired position pulses having one of a plurality of repetition rates each related to a corresponding one of a plurality of desired rates of movement of the blade;
    a second counter for counting said desired position pulses to provide a desired position count related to desired wiper position at each desired position pulse;
    error generating means for generating a position error signal in response to a comparison of said actual position count and said desired position count; and
    power means for applying electric power to said electric motor in relation to said position error signal.

8. The system recited in claim 7 further comprising:

command means for generating a change direction signal in response to a comparison of said actual position count with a position value related to a desired stop position of the blade; and switching means for changing rotational direction of said motor in response to said change direction signal.

9. The system recited in claim 8 wherein both said first counter and said second counter count up in response to one state of said change direction signal and count down in response to another state of said change direction signal.

10. The system recited in claim 7 further comprising an optical encoder coupled to said motor for providing phase pulses as said motor rotates.

11. The system recited in claim 10 further comprising a decoder for converting said phase pulses to said actual position pulses.

12. A windshield wiper system for controlling position and velocity of a wiper blade on a windshield, comprising:

a reversible electric motor coupled to the blade;

position indicating means for providing an actual position pulse for each predetermined angular movement of the blade across the windshield;

a first counter for counting said actual position pulses to provide an actual position count related to actual blade position;

means for generating desired position pulses at a repetition rate related to a desired blade velocity and aa gradually increasing repetition rate related to a desired blade acceleration and a gradually decreasing repetition rate related to a desired blade deceleration;

means for providing said desired blade acceleration by comparing said actual position count to a first reference value and for providing said desired blade velocity by comparing said actual position count to a second reference value and for providing said desired blade deceleration by comparing said actual position count to a third reference value;

a second counter for counting said desired position pulses for providing a desired position count related to desired blade position at each desired position pulse;

error generating means for generating a position error signal in response to a comparison of said actual position count and said desired position count; and power means for applying electric power to said electric motor in relation to said position error signal.

13. The system recited in claim 12 further comprising:

command means for generating a change direction signal in response to a comparison of said actual position count with a position value related to a desired stop position of the blade; and switching means for changing rotational direction of said motor in response to said change direction signal.

14. The system recited in claim 13 wherein both said first counter and said second counter count up in response to one state of said change direction signal and count down in response to another state of said change direction signal.

15. The system recited in claim 12 further comprising an optical encoder coupled to said motor for providing phase pulses as said motor rotates.

16. The system recited in claim 15 further comprising a decoder for converting said phase pulses to said actual position pulses.

17. A windshield wiper system for controlling position and velocity of a wiper blade on a windshield, comprising:

a reversible electric motor coupled to the blade;

position indicating means for generating actual position pulses as the wiper moves across the windshield;

a first counter for counting said actual position pulses to provide an actual position count related to actual blade position;

means for generating desired position pulses having a repetition rate related to a desired blade velocity;

a second counter for counting said desired position pulses for providing a desired position count related to desired wiper position at each desired position pulse;

error generating means for generating a position error signal in response to a comparison of said actual position count and said desired position count;

a third counter for counting said actual position pulses during a predetermined time period to generate a velocity signal related to actual blade velocity;

means for combining said velocity signal with said error signal to generate a modified error signal; and power means for applying electric power to said electric motor in relation to said modified error signal.

18. The system recited in claim 17 further comprising:

an accumulator for accumulating said velocity signal over a preselected time period to generate an acceleration signal; and modification means to further modify said modified error signal in response to said acceleration signal.

19. The system recited in claim 17 further comprising an optical encoder coupled to said motor for providing phase pulses as said motor rotates.

20. The system recited in claim 19 further comprising a decoder for converting said phase pulses to said actual position pulses.

* * * * *